US 11,714,999 B2

United States Patent
Bohnstingl et al.

(10) Patent No.: US 11,714,999 B2
(45) Date of Patent: Aug. 1, 2023

(54) NEUROMORPHIC DEVICE WITH CROSSBAR ARRAY STRUCTURE STORING BOTH WEIGHTS AND NEURONAL STATES OF NEURAL NETWORKS

(71) Applicant: INTERNATIONAL BUSINESS MACHINES CORPORATION, Armonk, NY (US)

(72) Inventors: Thomas Bohnstingl, Thalwil (CH); Angeliki Pantazi, Thalwil (CH); Evangelos Stavros Eleftheriou, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 16/685,045

(22) Filed: Nov. 15, 2019

(65) Prior Publication Data
US 2021/0150327 A1    May 20, 2021

(51) Int. Cl.
*G06N 3/00*    (2023.01)
*G06N 3/065*    (2023.01)
(Continued)

(52) U.S. Cl.
CPC ............... *G06N 3/065* (2023.01); *G06N 3/04* (2013.01); *G06N 3/08* (2013.01)

(58) Field of Classification Search
CPC ............ G06N 3/065; G06N 3/04; G06N 3/08; G06N 3/049
See application file for complete search history.

(56) References Cited

U.S. PATENT DOCUMENTS 9,152,827 B2    10/2015   Linderman
2014/0188771 A1   7/2014   Modha
(Continued)

FOREIGN PATENT DOCUMENTS

CN    107924227 A    4/2018
CN    109416758 A    3/2019
(Continued)

OTHER PUBLICATIONS

Kim et al. ("A Reconfigurable Digital Neuromorphic Processor with Memristive Synaptic Crossbar for Cognitive Computing", Comput. Syst. 11, 4, Article 38 (Apr. 2015), 25 pages) (Year: 2015).*
(Continued)

*Primary Examiner* — Michael J Huntley
*Assistant Examiner* — Imad Kassim
(74) *Attorney, Agent, or Firm* — Jordan T. Schiller (57) ABSTRACT

Neuromorphic methods, systems and devices are provided. The embodiment may include a neuromorphic device which may comprise a crossbar array structure and an analog circuit. The crossbar array structure may include N input lines and M output lines interconnected at junctions via N×M electronic devices, which, in preferred embodiments, include, each, a memristive device. The input lines may comprise $N_1$ first input lines and $N_2$ second input lines. The first input lines may be connected to the M output lines via $N_1 \times M$ first devices of said electronic devices. Similarly, the second input lines may be connected to the M output lines via $N_2 \times M$ second devices of said electronic devices. The analog circuit may be configured to program the electronic devices so as for the first devices to store synaptic weights and the second devices to store neuronal states.

18 Claims, 7 Drawing Sheets

(51) Int. Cl.
  *G06N 3/08* (2023.01)
  *G06N 3/04* (2023.01)

(56) References Cited

U.S. PATENT DOCUMENTS

| | | |
|---|---|---|
| 2016/0155046 A1 | 6/2016 | Appuswamy |
| 2016/0343452 A1 | 11/2016 | Ikeda |
| 2019/0005381 A1 | 1/2019 | Li |
| 2019/0057301 A1 | 2/2019 | Pantazi |
| 2019/0102170 A1* | 4/2019 | Chen ............ G11C 7/062 |
| 2019/0213234 A1 | 7/2019 | Bayat |
| 2019/0343452 A1 | 11/2019 | Ellspermann |

FOREIGN PATENT DOCUMENTS

| | | |
|---|---|---|
| CN | 107273972 B | 9/2019 |
| CN | 108985447 B | 10/2020 |
| CN | 114730379 A | 7/2022 |
| DE | 112020005613 T5 | 9/2022 |
| EP | 3340120 A1 | 6/2018 |
| GB | 2604835 A | 9/2022 |
| WO | 2021094861 A1 | 5/2021 |

OTHER PUBLICATIONS

Hu et al. ("Dot-Product Engine for Neuromorphic Computing: Programming 1T1M Crossbar to Accelerate Matrix-Vector Multiplication", DAC '16, Jun. 5-9, 2016) (Year: 2016).*
Miao Hu et al, "Memristor Crossbar-Based Neuromorphic Computing System: a Case Study", 2014 IEEE. (Year: 2014).*
Krestinskaya et al. ("Learning in Memristive Neural Network Architectures Using Analog Backpropagation Circuits", IEEE vol. 66, No. 2, Feb. 2019) (Year: 2019).*
Kim et al. ("NVM Neuromorphic Core with 64k-cell (256-by-256) Phase Change Memory Synaptic Array with On-Chip Neuron Circuits for Continuous In-Situ Learning", 2015 IEEE International Electron Devices Meeting (IEDM)) (Year: 2015).*
Wang et al. ("Energy efficient parallel neuromorphic architectures with approximate arithmetic on FPGA", vol. 221, Jan. 19, 2017, pp. 146-158) (Year: 2017).*
Intellectual Property Office, "Patents Act 1977: Examination Report under Section 18(3)," Patents Directorate, dated Aug. 4, 2022, 4 pages, GB Application No. 2208458.6.
Notification of Transmittal of the International Search Report and Written Opinion of the International Searching Authority, or the Declaration, International application No. PCT/IB2020/060075, dated Feb. 9, 2021, 8 pages.
Allen Institute of Cell Science, "Understanding the human cell", Our Research, https://alleninstitute.org/what-we-do/cell-science/our-research/, accessed Sep. 23, 2019, 5 pages.
Bellec et al., "Long short-term memory and learning-to-learn in networks of spiking neurons", 32nd Conference on Neural Information Processing Systems (NeurIPS 2018), Montreal, Canada, 11 pages.
Boybat, et al., "Neuromorphic Computing with Multi-Memristive Synapses", arXiv:1711.06507v1 [cs.ET] Nov. 17, 2017, 15 pages.
Burr et al., "Experimental Demonstration and Tolerancing of a Large-Scale Neural Network (165 000 Synapses) Using Phase-Change Memory as the Synaptic Weight Element", IEEE Transactions on Electron Devices, vol. 62, No. 11, Nov. 2015, pp. 3498-3507.
Ielmini, "Brain-Inspired Computing with Resistive Switching Memory (RRAM): Devices, Synapses and Neural Networks", Microelectronic Engineering 190, 2018, pp. 44-53.
Kuzum et al., "Synaptic electronics: materials, devices and applications", Topical Review, Nanotechnology 24 (2013) 382001, 22 pages, IOP Publishing.
Modha et al., "Cognitive Computing", Communications of the ACM, Aug. 2011, vol. 54, No. 8, p. 62-71.
Nandakumar et al., "Mixed-precision architecture based on computational memory for training deep neural networks", 2018 IEEE International Symposium on Circuits and Systems (ISCAS), 5 pages.
Pantazi et al., "All-memristive neuromorphic computing with level-tuned neurons", Nanotechnology 27 (2016) 355205, pp. 1-13.
Suri et al., "Physical aspects of low power synapses based on phase change memory devices", Journal of Applied Physics 112, 054904 (2012), accepted Aug. 9, 2012; published online Sep. 6, 2012, 10 pages.
Tuma et al., "Stochastic phase-change neurons", Nature Nanotechnology, vol. 11, Aug. 2016, www.nature.com/naturenanotechnology, pp. 693-700.
Wozniak et al., "Learning Spatio-Temporal Patterns in the Presence of Input Noise using Phase-Change Memristors", 2016 IEEE International Symposium on Circuits and Systems (ISCAS), May 22-25, 2016, pp. 365-368.
Intellectual Property Office, "Patents Act 1977: Examination Report under Section 18(3)," dated Jan. 5, 2023, 3 Pages, GB Application No. GB2604835.
Bohnstingl, et al., "Neuromorphic Device With Crossbar Array Structure Storing Both Weights and Neuronal States of Neural Networks," Application and Drawings, Filed on Oct. 28, 2020, 69 Pages, Related JP Patent Application Serial No. 2022-526383.
S.R., et al., "A phase-change memory model for neuromorphic computing," Journal of Applied Physics [article], Oct. 2018, 14 pages, vol. 124, No. 15, DOI: 10.1063/1.5042408, Retrieved from the Internet: <URL: https://www.researchgate.net/publication/328352112_A_phase-change_memory_model_for_neuromorphic_computing>.
Bichler, et al., "Visual Pattern Extraction Using Energy-Efficient "2-PCM Synapse" Neuromorphic Architecture," IEEE Transactions on Electron Devices, May 17, 2012 [accessed on Feb. 2, 2023], pp. 2206-2214, vol. 59, Issue 8, IEEE, DOI: 10.1109/TED.2012.2197951, Retrieved from the Internet: <URL: https://ieeexplore.ieee.org/document/6202332>.
UK Intellectual Property Office, Application No. GB 2208458.6, Examination Report dated Feb. 8, 2023 and Response dated Mar. 3, 2023, 4 pages.

* cited by examiner

NEUROMORPHIC DEVICE WITH CROSSBAR ARRAY STRUCTURE STORING BOTH WEIGHTS AND NEURONAL STATES OF NEURAL NETWORKS

BACKGROUND

The invention relates in general to the field of neuromorphic devices having crossbar array structures. In particular, it is directed to a neuromorphic device whose crossbar array structure comprises additional input lines to store neuronal states of a neural network, whereby the neuron function is at least partly implemented by an analog circuit of the device.

Machine learning often relies on artificial neural networks (ANNs), which are computational models inspired by biological neural networks in human or animal brains. Such systems progressively and autonomously learn tasks by means of examples; they have successfully been applied to, e.g., speech recognition, text processing and computer vision.

An ANN comprises a set of connected units or nodes, which compare to biological neurons in animal brains and are therefore called artificial neurons. Signals are transmitted along connections (also called edges) between artificial neurons, similarly to synapses. That is, an artificial neuron that receives a signal processes it and then signals connected neurons. Typically, the signals conveyed along such connections are analog real numbers and outputs of the artificial neurons are computed thanks to a non-linear function of the sum of its inputs.

Connection weights (also called synaptic weights) are associated with the connections and nodes; such weights adjust as learning proceeds. Each neuron may have several inputs and a connection weight is attributed to each input (the weight of that specific connection). Such connection weights are learned during a training phase and thereby updated. The learning process is iterative: data cases are presented to the network, typically one at a time, and the weights associated with the input values are adjusted at each time step.

Many types of neural networks are known, starting with feedforward neural networks, such as multilayer perceptrons, deep neural networks and convolutional neural networks. Besides, new types of neural networks emerge, such as spiking neural networks. A spiking neural network (SNN) substantially differs from usual neural networks, inasmuch as SNNs operate using spikes, which are discrete binary events that can occur asynchronously at any point in time, rather than analog values computed at regular time-steps. That is, in addition to neuronal and synaptic state, SNNs further incorporate the concept of time. I.e., neurons fire only when a membrane potential reaches a specific value, rather than firing at each propagation cycle as in, e.g., multi-layer perceptron networks. Firing means, in the context of SNNs, that a neuron generates a signal that reaches other neurons, which, in turn, increase or decrease their potentials according to the signals they receive from other neurons.

Neural networks are typically implemented in software. However, a neural network may also be implemented in hardware, e.g., as a resistive processing unit (relying on crossbar array structures) or an optical neuromorphic system. I.e., a hardware-implemented ANN is a physical machine that clearly differs from a classic computer (general- or specific-purpose computer) in that it is primarily and specifically designed to implement an ANN (for training and/or inference purposes). A hardware-implemented ANN could, at best, be emulated with a classic computer (though not with the same efficiency), while it cannot perform multiple data-processing tasks as a classical computer does.

The following paper forms part of the background art:
Nandakumar, S. R., et al. "A phase-change memory model for neuromorphic computing." J. Appl. Phys., vol. 124, no. 15, 21 Oct. 2018, p. 152135;
Tuma, T., et al. "Stochastic phase-change neurons." Nat. Nanotechnol., vol. 11, 16 May 2016, pp. 693-699.
Pantazi, A. et al. "All-memristive neuromorphic computing with level-tuned neurons." Nanotechnology 27 35 (2016): 355205.

SUMMARY

According to a first aspect, the present invention is embodied as a neuromorphic device, which essentially comprises a crossbar array structure and an analog circuit. The crossbar array structure includes N input lines and M output lines interconnected at junctions via N×M electronic devices, which, in preferred embodiments, include, each, a memristive device. The input lines comprise $N_1$ first input lines and $N_2$ second input lines. The first input lines are connected to the M output lines via $N_1 \times M$ first devices of said electronic devices. Similarly, the second input lines are connected to the M output lines via $N_2 \times M$ second devices of said electronic devices. The following relations hold: $N_1 \geq 1$, $N_2 \geq 1$, $N_1 + N_2 = N$, and $M \geq 1$. The analog circuit is configured to program the electronic devices so as for the first devices to store synaptic weights and the second devices to store neuronal states. In addition, the analog circuit is further configured to read out M output signals obtained from the M output lines according to a multiply-accumulate operation. The readout is based on $N_1$ input signals coupled into the first input lines, $N_2$ control signals coupled into the second input lines, and values stored on each of the first devices and the second devices, in operation.

According to the present solution, both the synaptic weights and neuronal states (e.g., membrane potentials) can be represented by electronic devices at the junctions (e.g., memristive devices). This approach is nevertheless compatible with various electronic devices (e.g., flash cells, memristive devices, static random-access memory devices, etc.). The present solution makes it possible to compute neuronal states without additional circuitry and, in particular, without any conversion being needed in the digital domain, in constant time. As the analog circuit allows neuronal states to be computed in the analog domain, the proposed solution is, in principle, more time-efficient than the solutions enabled by prior neuromorphic devices based on crossbar array structures.

In embodiments, the analog circuit is further configured to update neuronal states stored on at least some of the $N_2 \times M$ second devices, whereby said at least some of the $N_2 \times M$ second devices can be re-programmed according to M output signals as previously read out by the analog circuit, in operation.

In further embodiments, the analog circuit is further configured to couple said $N_1$ input signals and said $N_2$ control signals into the $N_1$ first input lines and the $N_2$ second input lines, respectively.

In preferred embodiments, the second input lines comprise a given control line connected to the output lines via M given electronic devices. Such electronic devices are programmable by the analog circuit to store M initial membrane potential values. In addition, the analog circuit is further configured to couple a given control signal into said given control line, so as for the M output signals read out to be representative of M final membrane potential values, the later obtained based on said M initial membrane potential values, as leaky integrators of synaptic inputs obtained by coupling said $N_1$ input signals into the $N_1$ first input lines, in operation.

In that respect, the given control signal (as coupled into said given control line) is preferably representative of a decay parameter $\alpha$, in operation. In addition, the analog circuit may further be configured to adjust the $N_1$ input signals for them to be representative of synaptic input values that are complementarily scaled by $1-\alpha$.

Preferably, the analog circuit is further configured to update membrane potential values stored on the M given electronic devices by re-programming such devices according to M output signals representative of M final membrane potential values as previously read out by the analog circuit, in operation.

In embodiments, the analog circuit is further configured to perform, for each of the M output lines, a comparison between each of the M output signals read out and a threshold value $\theta$.

Preferably, the analog circuit is further configured to produce, for each of the M output lines, a signal based on an outcome of said comparison, and to reset values stored on any of said M given electronic devices.

In preferred embodiments, the second electronic devices comprise M further electronic devices and the second input lines comprise a further control line connected to the output lines via the M further electronic devices. The latter are programmable by the analog circuit to store M threshold values, so as for the M output signals read out to be representative of M differences of the M final membrane potential values and the M threshold values for a suitably selected, further control signal coupled into said further control line, in operation.

Preferably, the analog circuit is configured to select the further control signal to be coupled into said further control line, so as for the further control signal to be representative of either an input value of 0 or an input value of −1. For an input value of 0, the M output signals read out are representative of the M final membrane potential values. For an input value of −1, the M output signals read out are representative of differences of the M final membrane potential values and the M threshold values.

In preferred embodiments, the second input lines comprise three control lines, including said given control line. The three control lines include two additional control lines beyond said given control line. Said two additional control lines are connected to the output lines via 2×M additional electronic devices of said electronic devices. The analog circuit is further configured to program the 2×M additional electronic devices for them to store operands of adaptive firing thresholds.

Preferably, the analog circuit is further configured to couple two additional control signals into said two additional control lines and to select each of the two additional control signals so as for the output signals read out by the circuit to be representative of M differences of M final membrane potential values and M adaptive firing thresholds.

More preferably, the analog circuit is further configured to re-program M electronic devices of said 2×M additional electronic devices that connect one of said two additional control lines, so as to update operands stored thereon according to output values as previously read out (e.g., during a previous iteration) by the analog circuit, in operation.

In embodiments, the analog circuit is further configured to re-program the $N_1 \times M$ first devices, so as to alter synaptic weights stored thereon according to an automatic learning process.

Preferably, said analog circuit comprises a programming circuit and a readout circuit, the latter connected to the former, wherein the readout circuit is configured to read out said M output signals and the programming circuit is configured to program the electronic devices according to output signals previously read out by the readout circuit.

More preferably, said programming circuit comprises an input circuit, the latter configured to, on the one hand, couple signals into the input lines and, on the other hand, select signals to be coupled into the input lines, so as to program the electronic devices based on signals coupled into the input lines, in operation.

According to another aspect, the invention is embodied as a neuromorphic system. The system comprises L neuromorphic devices, each according to embodiments as described above. The system further comprises a communication bus, wherein the system is configured to forward output signals as read out at a given one of the L neuromorphic devices to a next one of the L neuromorphic devices via the communication bus.

According to a final aspect, the invention is embodied as a method of operating a neuromorphic device. The method relies on a neuromorphic device with an analog circuit and a crossbar array structure. The latter includes N input lines and M output lines interconnected at junctions via N×M electronic devices. The input lines comprise $N_1$ first input lines and $N_2$ second input lines that are connected to the M output lines via $N_1 \times M$ first devices of said electronic devices and $N_2 \times M$ second devices of said electronic devices, respectively, where $N_1 \geq 1$, $N_2 \geq 1$, $N_1 + N_2 = N$, and $M \geq 1$. The method comprises programming, via the analog circuit, the electronic devices so as for the first devices to store synaptic weights and the second devices to store neuronal states. In addition, the method comprises reading out, again via the analog circuit, M output signals obtained from the M output lines according to a multiply-accumulate operation. The latter is based on $N_1$ input signals coupled into the first input lines, $N_2$ control signals coupled into the second input lines, and values stored on each of the first devices and the second devices.

In preferred embodiments, the method further comprises updating neuronal states stored on at least some of the $N_2 \times M$ second devices by re-programming said at least some of the $N_2 \times M$ second devices according to M output signals as previously read out with the analog circuit.

Devices, systems and methods embodying the present invention will now be described, by way of non-limiting examples, and in reference to the accompanying drawings.

BRIEF DESCRIPTION OF SEVERAL VIEWS OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIGS. 3A-3B schematically represent a memristive crossbar array of a neuromorphic device according to embodiments, where the device is meant to implement a layer of a spiking neural network. FIG. 3A schematically depicts operations carried by an analog circuit, whereby neuronal states are updated in the memristive crossbar array and membrane potentials are compared to a threshold to generate the neuron outputs. FIG. 3B explicitly shows a component of the analog circuit that is used to perform the comparison, in output of the memristive crossbar array.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION OF EMBODIMENTS OF THE INVENTION

Figure 1:
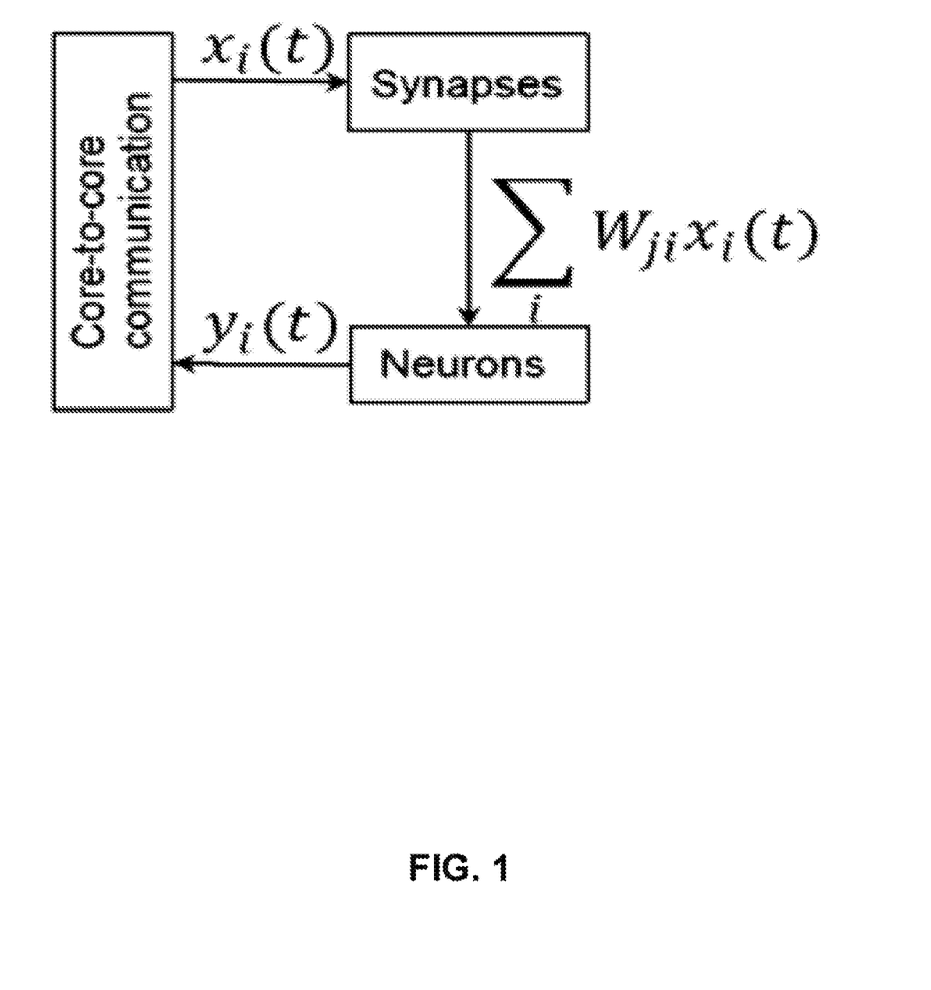
FIG. 1 is a diagram schematically illustrating high-level components of a prior art neuromorphic system. The system comprises a memristive crossbar array and implements an artificial neural network. The neuron functionality is implemented by a digital processing engine: the input to the neuron is the result of a multiply-accumulate operation that is translated to the digital domain to implement the neuron functionality.

Neuromorphic devices have been proposed, which are based on crossbar array structures. Such devices are used to implement ANNs. However, an external circuitry (involving a digital processing unit) is needed to implement the neuron functionality. I.e., most of the neuron functionality relies on a digital processing unit connected to the analog circuit, see for example S. R. Nandakumar, et al., ISCAS 2018, cited in the background section. That is, only the synaptic weights are stored in the analog unit, while the neuronal activation is implemented in the digital processing unit. This situation is synthetically captured in FIG. 1: synapses are implemented in a memristive crossbar array. A pulse width modulation (PWM) circuit may for instance be used to generate inputs $x_i(t)$ to the synapses. However, the neuron functionality is implemented by a digital processing engine and a static random-access memory (SRAM). This functionality is thus not directly mapped on the crossbar array. The input to the neuron is the result of a multiply-accumulate operation, i.e., $\Sigma_i W_{ji} x_i(t)$, performed in the analog space. This result is then translated to the digital domain using an analog-digital converter (ADC) circuitry. The neuron activation function $f(\Sigma_i W_{ji} x_i(t))$ is computed in the digital domain, giving rise to outputs $y_j(t)$, which are passed to the core-to-core communication bus, which relays such signals to neurons of a next layer.

Starting from these observations, the present inventors have realized that the neuron functionality could at least partly be integrated in the crossbar array structure. They have accordingly developed various neuromorphic devices and corresponding computing systems, which can be used to implement usual ANNs, as well as SNNs. Such solutions are described in detail in the following description In reference to FIGS. 3A-3B and FIGS. 4-5, an aspect of the invention is first described, which concerns a neuromorphic device 10-12. Essentially, this device comprises a crossbar array structure and an analog circuit, where the latter integrates multiple functionalities.

The crossbar array structure 110 includes N input lines (horizontal lines) 111, 112 and M output lines (vertical lines) 120. The input lines and the output lines are interconnected at junctions, via N×M electronic devices 131, 132, which preferably are memristive devices. Such devices are also referred to as "cells" in the present document.

Interestingly here, the input lines 111, 112 decompose into two subsets of input lines, which are respectively referred to as first input lines and second input lines. As we shall see, the first input lines and the second input lines have different functions. Similarly, the electronic devices 131, 132 define two subsets, which are respectively referred to as first devices 131 and second devices 132.

Structurally speaking, the input lines decompose into $N_1$ first input lines 111 and $N_2$ second input lines 112. The first input lines 111 are connected to the M output lines 120 via $N_1 \times M$ first devices 131, while the second input lines 112 are connected to the M output lines 120 via $N_2 \times M$ second devices 132. The various numbers above are constrained as follows: $N_1 \geq 1$, $N_2 \geq 1$, $N_1 + N_2 = N$, and $M \geq 1$, subject to additional remarks below.

The analog circuit 140-170 is notably configured to program S110 the electronic devices 131, 132, for them to store values or, more exactly, to have properties (e.g., an electrical conductance, or an amount of stored electrical charges) interpretable as such values. Note, all references "Sijk" refer the methods steps, which notably appear in the flowcharts of FIG. 6. As in prior art devices, the first devices 131 may accordingly be programmed to store synaptic weights. However, the second devices 132 are here programmed by the analog circuit to store neuronal states of the artificial neural network (ANN) implemented by the array.

The analog circuit is further configured to read out S140 M output signals (e.g., electrical currents) obtained from the M output lines 120. The readout is carried out according to a multiply-accumulate operation, which takes into account signals (e.g., currents or voltages biases) coupled into each of the input lines (these including the second input lines), which are used for applying the control signals. Namely, the readout is based on $N_1$ input signals coupled S121 into the first input lines 111, while $N_2$ control signals are coupled S122 into the second input lines 112, in operation. As per the multiply-accumulate operations performed, values stored S110 on each of the first devices 131 and the second devices 132 impact the readout.

In addition, the same analog circuit 140-170 is preferably used to couple input signals into the input lines. I.e., a third function of the circuit may be to couple S120 said $N_1$ input signals and said $N_2$ control signals into the $N_1$ first input lines 111 and the $N_2$ second input lines 112, respectively. Thus, the analog circuit may have three distinct functions: (i) program S110 the electronic devices 131, 132; (ii) read out S140 output signals obtained from the M output lines 120;

and (iii) couple input signals into the input lines, in order to read out said output signals. In variants, a separate input circuit may be used for either function. In both cases, inputs may be achieved via a PWM circuit, for example.

According to the above relations, i.e., $N_1 \geq 1$, $N_2 \geq 1$, $N_1+N_2=N$, and $M \geq 1$, there is, a minima, at least one output line and at least two input lines. The at least two input lines comprise at least one input line, i.e., a first input line, for coupling at least one input signal (corresponding to synaptic inputs). The at least two input lines further comprise at least one control line, i.e., a second input line, this time for applying control signals. The control signals applied are normally constant, at least during one operation cycle (e.g., to allow membrane potentials to be stored on the second subset of electronic devices) but may vary from one operation cycle to the other, as discussed later. Such control signals may further be selectable signals, e.g., to include thresholds, possibly varying thresholds, in the crossbar array, as in embodiments discussed later.

In practice, however, several input lines 111 will likely be involved (e.g., 8, 32, . . . , 250, . . . 1000, etc., where this number can be an even or odd number). In likely embodiments, the number of input lines 111 will be on the order of several hundreds. Similarly, several output lines 120 will typically be provided, typically between 8 and 2000. The number of control lines 112 depends on the level of sophistication sought; one, two, three or more control lines may be involved, as illustrated later in reference to FIGS. 3A-3B and FIGS. 4-5.

The first and second input lines will preferably form well-separated subsets, in practice. I.e., the present devices 10-12 preferably comprise non-overlapping subsets of input lines, such that the array exhibits a first subset of successive input lines, provided for coupling input values, while a distinct, second subset of successive input lines are provided for applying control signals, as necessary to account for neuronal states of the device.

The multiply-accumulate operation carried out by the analog circuit results in that signals coupled into the input lines are respectively multiplied by values stored on the electronic devices at the junctions, as usual in memristive crossbar arrays. In the present case, however, the analog multiply-accumulate operation takes into account control signals. Thus, signals coupled into the first input lines 111 and the second input lines 112 are respectively multiplied by values stored on the first electronic devices and the second electronic devices.

Interestingly, the present devices 10-12 can be used to implement either a usual ANN or, even, a spiking neural network (SNN), it being noted that SNNs are considered to be a sub-class of general ANNs in the present document. Thus, ANNs are here meant to cover SNNs, unless otherwise indicated.

Strictly speaking, however, the architectures of the devices shown in FIGS. 3A-3B and FIGS. 4-5 correspond to single layers of nodes, rather than multilayer networks. Thus, a neuromorphic device 10-12 as described above normally corresponds to a single layer of a neural network (NN). Such a neuromorphic device 10-12 can be regarded as an analog core processing device. Their architectures may, in principle, possibly be expanded (or stacked) to embody several connected layers (hence forming a multilayer network), or can be connected, e.g., via core-to-core communication bus (possibly including digital processing units). That is, several devices 10-12 such as shown in FIGS. 3A-3B and FIGS. 4-5 can be coupled, hence making up a neuromorphic system 1, as described later in reference to FIG. 2, in respect of another aspect of the invention.

Note, the weights as stored on the first devices 131 are normally constant for inference purposes, whereas they would need be re-programmed for learning purposes. For learning, the analog circuit 140-170 can be used to re-program the $N_1 \times M$ first devices 131, so as to alter synaptic weights stored thereon and, this, according to any suitable automatic learning process. More generally though, the present devices 10-12 can serve for both learning and inference purposes.

As evoked earlier, the analog circuit 140-170 can for example comprise an input circuit, a readout circuit and a programming circuit. Interestingly, the input circuit and the programming circuit can be formed as a same circuit, inasmuch as the applied signals can be selected in such a manner as to either couple signals into the input lines, or to program the cells, as in preferred embodiments. Note, this analog circuit can also be regarded as an analog processing unit, since it includes a programming functionality. Still, this analog circuit may nevertheless be coupled to a digital processing unit, and the digital processing unit may possibly perform part of the computations necessary for a subsequent programming, as in embodiments discussed later.

According to the present solution, both the synaptic weights and neuronal states (e.g., membrane potentials) can be represented by electronic devices at the junctions (e.g., memristive devices). This approach is nevertheless compatible with various electronic devices, e.g., flash cells, memristive devices, SRAM devices, etc. The present solution makes it possible to compute neuronal states without additional circuitry and, in particular, without any conversion being need in the digital domain, in constant time. Because the analog circuit used allows neuronal states to be computed in the analog domain, the proposed solution can, in principle, be more time-efficient than prior neuromorphic devices.

For instance, neuron outputs can be directly generated from the multiply-accumulate operation performed with the crossbar array, e.g., using a comparator circuit. There is no need to translate the signal in the digital domain (thus no ADC is needed in the crossbar structure in that case) and store it into a memory (i.e., no SRAM is needed for that purpose).

A simple activation function can be implemented, e.g., based on comparisons with one or more threshold values, again in the analog domain, as in preferred embodiments directed to SNN implementations. Output spikes can be computed analogically, and then transmitted to another, similar device 10-12 as binary signals, using a usual core-to-core infrastructure. Incidentally, the present approach is compatible with the standard address event representation (AER) protocol for the core-to-core communication.

All this is now described in detail, in reference to particular embodiments of the invention. To start with, each of said electronic devices of the neuromorphic device 10-12 may possibly include a memristive device, as evoked earlier. Any type of memristive device may be contemplated, such as phase-change memory cells, resistive random-access memory (RRAM), SRAM, or electro-chemical random-access memory (ECRAM). In variants, flash cells may be relied on.

In typical embodiments, the analog circuit 140-170 of the neuromorphic device 10-12 is further configured to update S116, S118 neuronal states stored on at least a subset of the $N_2 \times M$ second devices 132. More precisely, such neuronal states are updated by re-programming S116, S118 the second devices of said subset according to M output signals as previously read out S140 by the analog circuit, in operation. Note, the update operations will typically be iterative, i.e., neuronal states may be updated at each operation cycle.

Said neuronal states shall include values computed as the result of multiply-accumulate operations, which can be exploited for usual ANN applications. In variants, however, said neuronal states may include membrane potential values, for SNN applications as now described in reference to FIGS. 3A-3B and FIGS. 4-5. That is, in embodiments, the second input lines comprise a given control line 112, which is connected to the M output lines 120 via M given electronic devices 132. Said given electronic devices 132 are programmable by the analog circuit 140-170, so as for them to store M initial membrane potential values, as assumed in FIGS. 3A-3B and FIGS. 4-5. Thus, in this case, neuronal states captured by the device 132 comprise, a minima, membrane potential values. Moreover, the analog circuit 140-170 can be further configured to couple S122 a given control signal into said given control line 112, so as for the M output signals read out S140 to be representative of M final membrane potential values. Note, the latter can be regarded as "final" membrane potential values, as opposed to "initial" values captured by the devices 132. More precisely, the final membrane potential values are obtained based on said M initial membrane potential values, as leaky integrators of synaptic inputs, which are themselves obtained by coupling S121 said $N_1$ input signals into the $N_1$ first input lines 111, in operation.

In that respect, and as further seen in FIGS. 3A-3B and FIGS. 4-5, the control signal coupled into the control line 112 is preferably representative of a decay parameter $\alpha$, in operation. Meanwhile, the analog circuit 140-170 may further be configured to adjust S120 the $N_1$ input signals for them to be representative of synaptic input values that are complementarily scaled, i.e., by $1-\alpha$. Thus, the evolution of the membrane potential can be written:

$$V_j(t+\delta t) = \alpha V_j(t) + \Sigma_i W_{ji}[(1-\alpha)x_i(t-d_{ji})],$$

where $d_{ji}$ is a synaptic delay, which is typically fixed (though this parameter may possibly be trained, in principle). In variants, scaled weights may be stored on the electronic devices.

Note, more than one such line 112 may be used to store the membrane potential. I.e., the membrane potential V of a given neuron may possibly be stored several devices 132 in a same column. For example, n lines 112 (n>1) may be used, together with n×M electronic devices 132 to store fractions of the membrane potential. For a given neuron, this fraction may for example simply amount to V/n. Adopting a configuration with multiple control line 112 enhances the accuracy of membrane potential representation, if needed. In the following, though, only one control line 112 is assumed to be used to store the membrane potential, for simplicity.

Preferably then, the analog circuit 140-170 is further configured so as to update S116 membrane potential values stored on the M given electronic devices 132. This is achieved by re-programming S116 the M given electronic devices 132 according to M output signals representative of M final membrane potential values as previously read out S140 by the analog circuit, in operation. Again, the membrane potential values may be iteratively updated (thereby changing values at each cycle). That is, the corresponding elements can be programmed to store different values, updated at each cycle according to output signals as read during a previous cycle. Such an operation is symbolically depicted in FIGS. 3A-3B and FIGS. 4-5, which show a circuit component 140 adapted to perform readouts S140, based on which new membrane potential values are updated S116 in the devices 132 (see the corresponding backloop routing arrow in FIG. 3A-3B).

Iterative updates as evoked above should, however, not be confused with schemes of iterative programming, where, e.g., individual PCM cells are programmed using multiple pulses in an iterative manner. In the present context, iterative steps to program the cells are not necessarily required. Cells can also be programmed with pulses only, potentially representing coarser update steps. In addition, here the updated membrane potential can be computed in constant time (meaning that all output results are obtained at each operation cycle). However, the update will have a linear complexity.

Interestingly, the comparison of membrane potential values with threshold values can be performed analogically too, so as to speed-up computations. Namely, in embodiments, the analog circuit 140-170 is further configured to perform S160, S165, for each of the M output lines 120, a comparison between each of the M output signals read out and a threshold value $\theta$. Note, this threshold value may be a single, constant threshold value. In variants, the device may be designed to allow comparisons with several (distinct) threshold values, which differ from one output line 120 to the other. In further variants, the threshold values may be varied throughout the operation cycles.

Figure 3A:
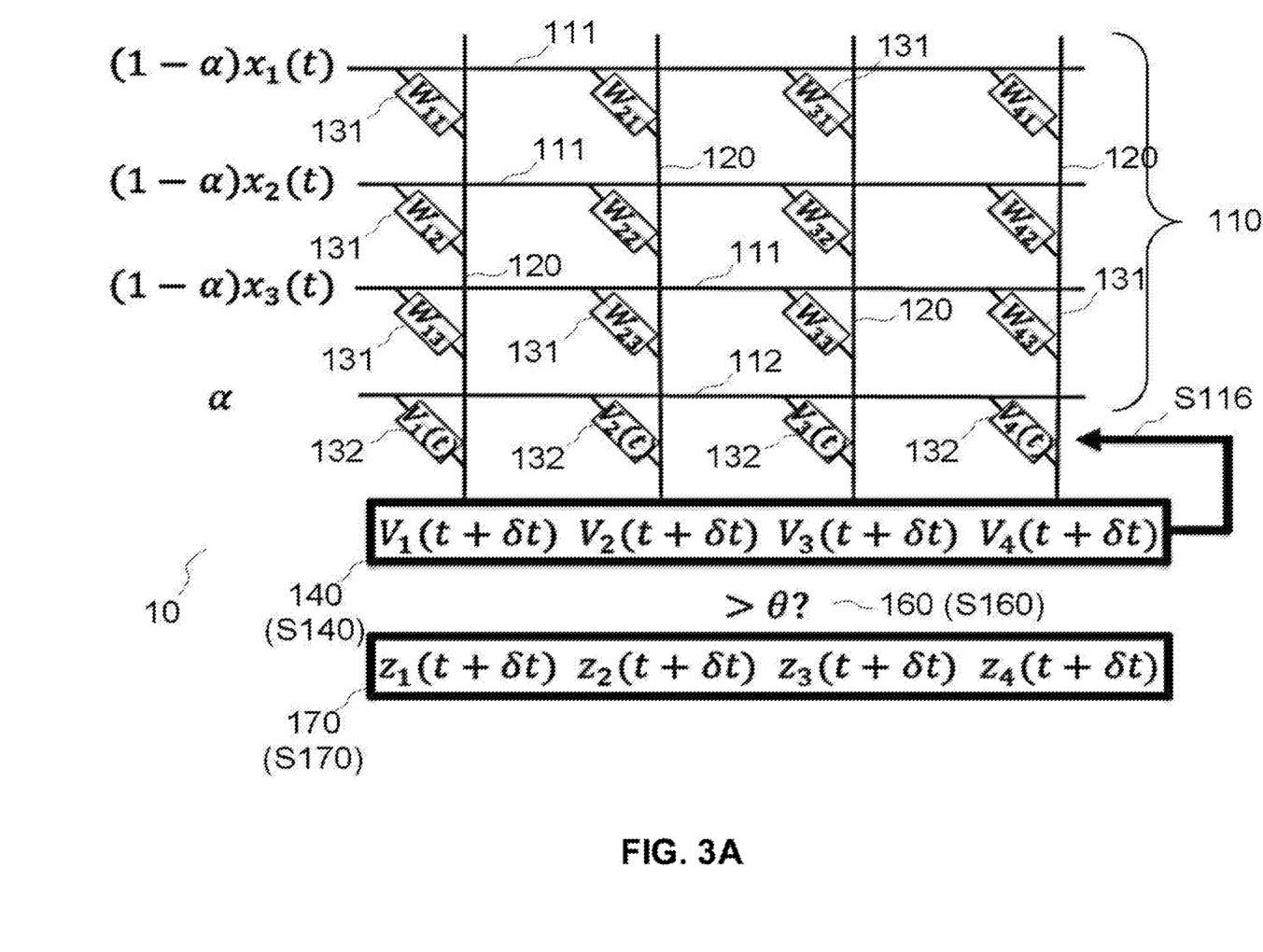
Figure 3B:
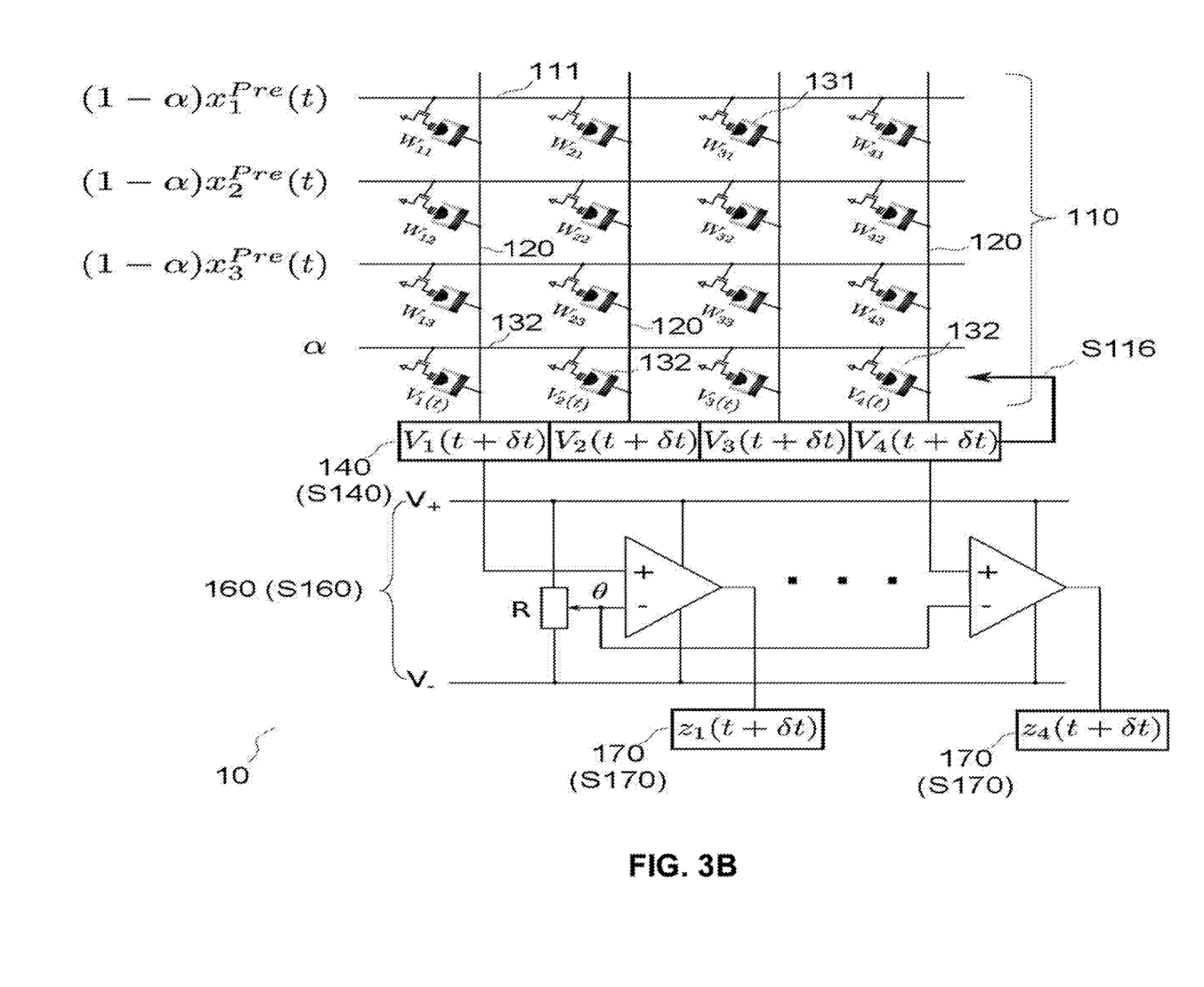

The comparisons can be performed analogically, e.g., with the help of comparators, as assumed in FIG. 3B. This example shows a layout of a circuit component 160, which makes it possible to analogically compare membrane potential values to threshold values $\theta$ (which may possibly differ across the output lines 120). Moreover, the circuit component 160 compares the result of the difference $V-\theta$ to zero, and the output is fed to further circuit components 170.

The circuit components 170 form part of the analog circuit 140-170 too. Such components 170 make it possible to produce S170 a signal for each of the M output lines 120, assuming the above conditions are met. The signals produced can be regarded as spikes. Still, the corresponding signals can either be represented by analog signals or binary signals. Such signals are produced based on an outcome of the comparison between the membrane potential values and corresponding thresholds. Note, however, that one may further need to compare the signal corresponding to the difference $V-\theta$ to a signal corresponding to zero in practice, in order to determine whether the measured potentials have indeed exceeded their respective thresholds. I.e., in the example of FIGS. 3A-3B and FIGS. 4-5, an additional comparison to zero may be performed, e.g., using an analog comparator, in order to decide whether to produce the final spike output $z_j$. In other words, if the membrane potential crosses the threshold, a spike $z_j$ is obtained, which can then be propagated to one or more following neurons.

Moreover, the circuit component 160 is operatively connected to the programming circuit, so as for the latter to reset S114 values stored on any of said M given electronic devices 132. I.e., if a neuron emits a spike, then the corresponding membrane potential needs to be reset.

Figure 4:
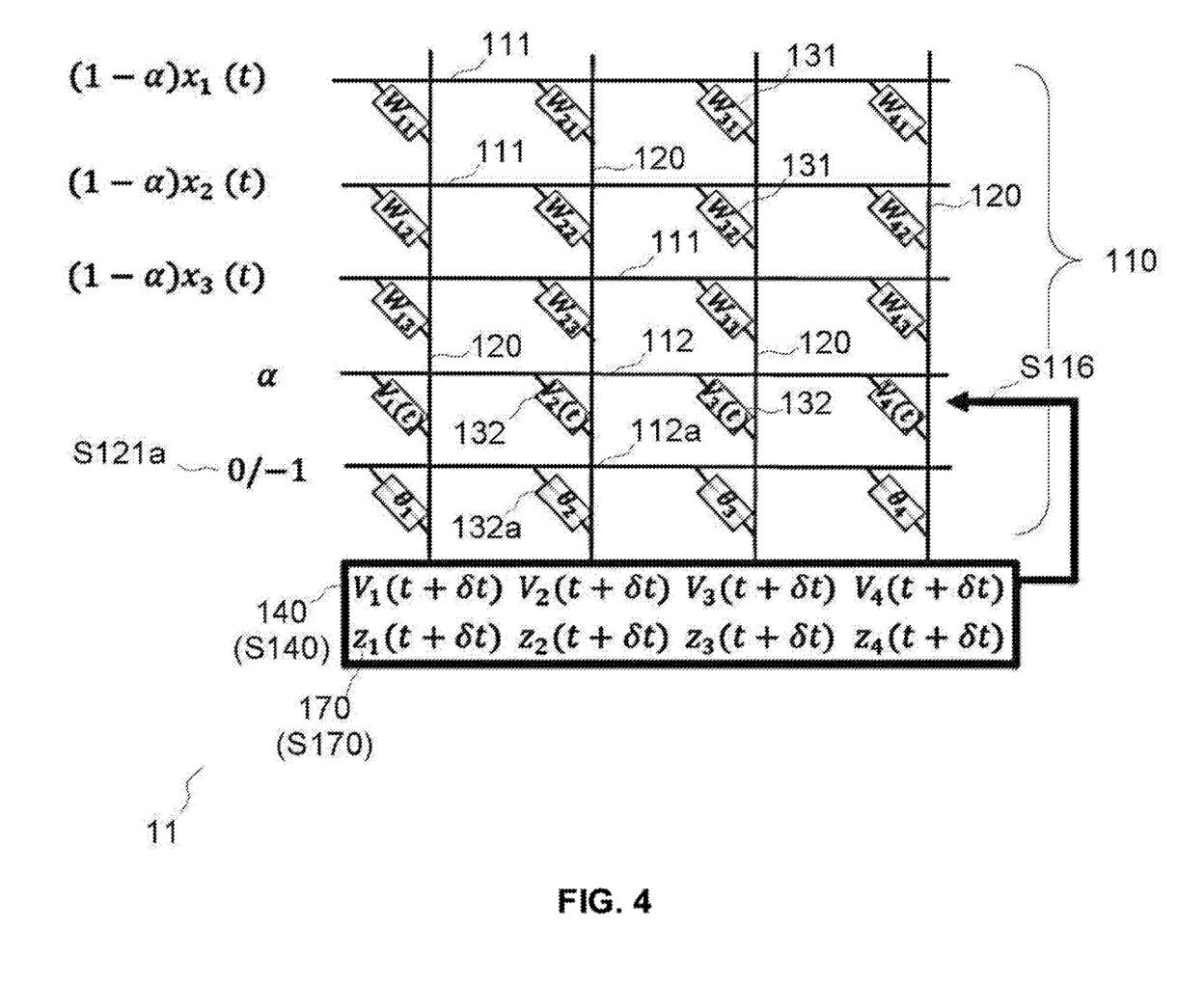
FIG. 4 shows a variant to FIG. 3B, where said component of the analog circuit as used to perform the comparison is now integrated in the memristive crossbar array, as in embodiments.

In variants to FIG. 3B, the functionalities related to the comparisons (to threshold values and then to zero values) can be integrated in the crossbar array structure, as now discussed in reference to FIG. 4. Such an approach makes it possible to leverage the crossbar array structure, leading to a more integrated solution (only one additional control line is needed to achieve this, though additional control lines may possibly be desired).

So far, the neuronal states captured by the electronic devices 132 shown in FIG. 3B were only including the membrane potentials. As we shall see now, the threshold values too can be captured by additional electronic devices 132a, as in the embodiment of FIG. 4. In this example, the second electronic devices 132, 132a of the neuromorphic device 11 comprise M further electronic devices 132a. In addition, the second input lines 112, 112a comprise a further control line 112a, which is connected to the output lines 120 via the M further electronic devices 132a. The devices 132a are programmable by the analog circuit 140-170 to store M threshold values. This way, the M output signals as eventually read out S142 may be representative of M differences of the M final membrane potential values and the M threshold values as stored on the devices 132a (again by virtue of the multiply-accumulate operation), provided that a suitably selected control signal is coupled S122 into the control line 112a, as discussed below.

Note, the threshold values captured by the electronic devices 132a will normally not depend on the output signals, at least in simple implementations. However, since the devices 132a are programmable by the analog circuits, the values captured by the devices 132a may well be made dependent on the output signals, in more sophisticated variants. And again, more than one control lines 112a may be relied on, if necessary.

In more detail, the analog circuit 140-170 may possibly be configured to select the control signal to be coupled into control line 112a, for this control signal to be representative of either an input value of 0 or an input value of −1, as assumed in the example of FIG. 4. When the coupled signal corresponds to an input value of 0, the M output signals eventually read out S140 are representative of the sole membrane potential values. However, when the coupled signal corresponds to an input value of −1, the M output signals are now representative of differences V−θ, i.e., differences of the M final membrane potential values and the M threshold values. Accordingly, suitably selected signals allow to read either membrane potential values (as needed to update the devices 132) or differences between such membrane potential values and threshold values (as needed to determine whether to "fire" or not). Two readouts are thus needed in that case.

Figure 5:
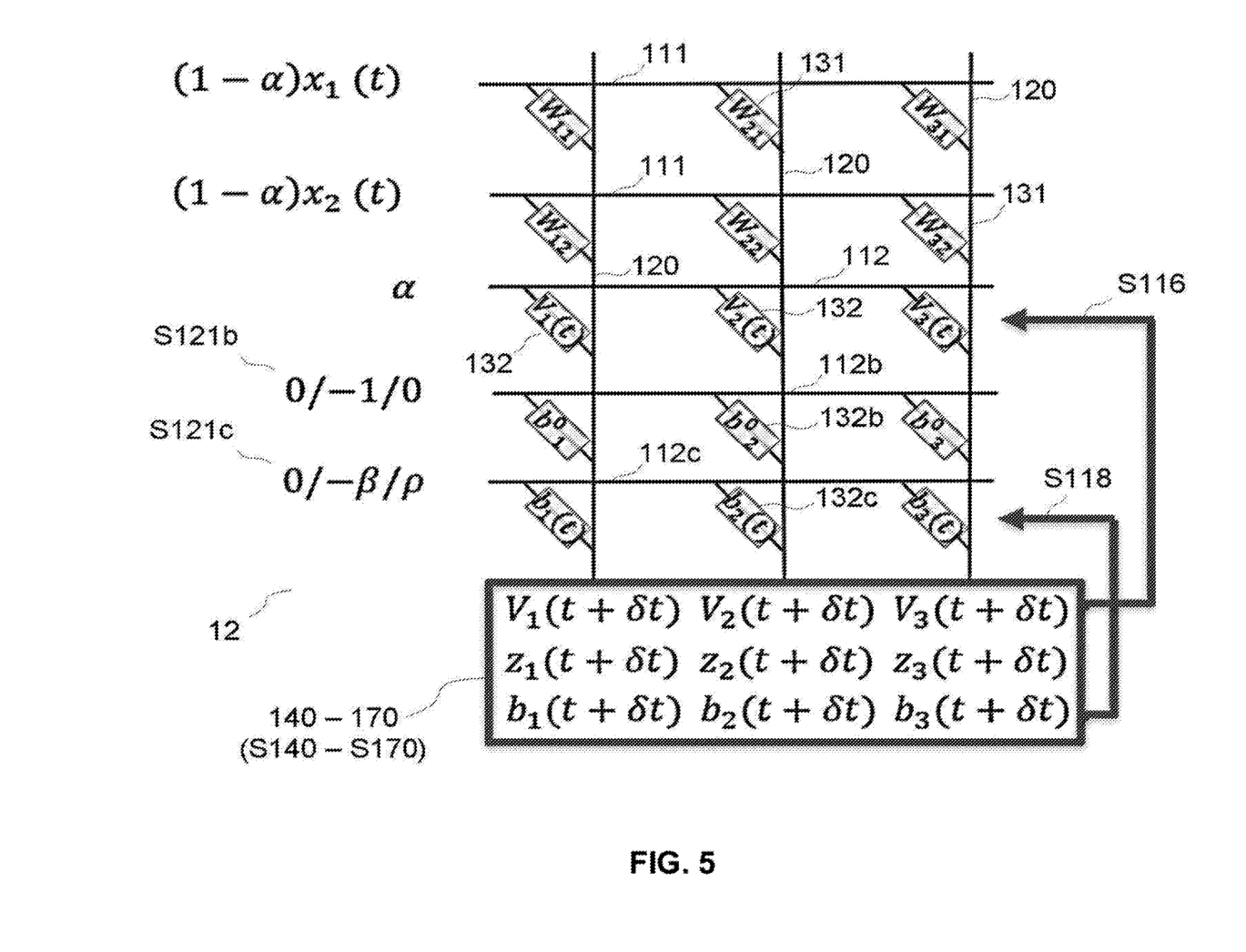
FIG. 5 shows a variant to FIG. 4, where the analog circuit comprises an additional component, integrated in the memristive crossbar array, to program electronic devices of the array for them to store operands of adaptive firing thresholds, as in embodiments.

Additional control lines may possibly be included, e.g., in order to account for operands of adaptive firing thresholds, as now discussed in reference to FIG. 5. That is, in embodiments, the input (control) lines of the neuromorphic device 12 now comprise three types of control lines 112, 112b, 112c. Namely, they notably include the control line 112 for storing membrane potential values, as described earlier in reference to FIGS. 3A-3B and 4. In addition, two additional control lines 112b, 112c are now included, which are connected to the output lines 120 via 2×M additional electronic devices 132b, 132c. In that case, the analog circuit 140-170 can further be designed so as to program the 2×M devices 132b, 132c for them to store operands of adaptive firing thresholds. This makes it possible to achieve advanced spiking neuron models with varying firing thresholds, in contrast to fixed thresholds, as exemplified below.

Note, instead of three control lines 112, 112b, 112c, three sets of control lines may be involved, as each of the neural state features (membrane potential, and adaptive threshold operands) may be captured through more than one line in the crossbar array.

Similar to the selectable signals coupled into the control line 112a of the device of FIG. 4, the analog circuit 140-170 of FIG. 5 may now be used to couple two additional control signals into the control lines 112b, 112c and to select S121b, S121c each of the two additional control signals, so as to obtain difference signals. That is, for suitably chosen control signals, the output signals as eventually read out by the circuit may be representative of M differences of M final membrane potential values and M adaptive firing thresholds.

In addition, some of the operands may need be updated (e.g., iteratively at each operation cycle), which can be achieved by re-programming the devices 132c based on output values as previously obtained (e.g., during a previous iteration), as illustrated in FIG. 5. Namely, the analog circuit 140-170 may possibly be used to re-program S118 M electronic devices 132c of said 2×M additional devices, i.e., the devices that connect the control line 112c. This is done so as to update (e.g., iteratively) operands stored thereon and, this, according to a previously obtained output values. Note, only the electronic devices 132c need to be programmed in that case, whereas the electronic devices 132b remain fixed (at least during a single operation), where they behave just like electronic devices 132a.

Note, the implementation of the adaptive threshold is quite similar to that of the threshold of FIG. 4. The varying threshold is noted $B_j(t)$. This quantity can be written:

$$B_j(t) = b_j^0 + \beta b_j(t), \text{ with}$$

$$b_j(t+\delta t) = \rho_j b_j(t) + (1-\rho_j) z_j(t).$$

In the above equations, $b_j^0$ and $b_j(t)$ are operands captured by the devices 132b, and 132c, respectively, for the $j^{th}$ output line, where $b_j^0$ is fixed, contrary to $b_j(t)$, which need be updated at each cycle. The evolution of $B_j(t)$ is thus determined by two parameters $\beta$ and $\rho_j$, where the first parameter is constant, while the second may differ for each column. Thus, in order to compute $B_j(t)$ according to the above equations, it is sufficient to be able to select signals coupled into the control lines 112b, 112c, so as for the signals coupled into lines 112b and 112c to be representative of either {0, 0}, {−1, −β}, or {0, ρ}, as indicated in FIG. 5. Performing several readouts while suitably selecting the control signals allows all the components to be successively read out and computed, namely $V_j(t)$, $B_j(t)$, $z_j(t)$, and then $b_j(t)$. The computation of all neuronal states involved (membrane potentials and adaptive thresholds) can still be performed in constant time in that case.

As said, the analog circuit 140-170 has distinct functions, which can be provided by different circuit components. In particular, the circuit may comprise a programming circuit and a readout circuit 140, the latter connected to the former. The readout circuit is designed to read out M output signals, while the programming circuit is configured to program (e.g., iteratively) the electronic devices 132, 132a-c of FIGS. 3A-3B and FIGS. 4-5, where some of these devices can be re-programmed based on output signals as previously read out by the readout circuit, as discussed above.

Such circuit components are known per se in crossbar array structures. A first difference with respect to prior art circuits is that, in the present case, the analog circuit 140-170 extends to additional input lines, namely control lines 112, 112a-c, used to store neuronal states. The multiply-accumulate operations remain unchanged, except they now include additional row lines, all other things being equal. Thus, the readout circuit component remains essential similar to readout circuits as used in prior crossbar array structures. Another difference, however, is that several readout operations need be performed here (e.g., 1, 2, or 3 in the examples of FIGS. 3A-3B and FIGS. 4-5), in order to obtain all quantities of interest. The computational cost of the additional operations required to obtain such quantities remains advantageous, since such operations are carried out analogically, i.e., without any conversion to the digital domain. That is, once said operations have been performed analogically, they do not require conversions and do then not need be carried out digitally, whence the benefit in terms of computational speed.

Note, the programming circuit may for instance amount to a mere input circuit, designed to couple signals into the input lines and select signals to be coupled into such input lines. However, some of the programming logic may be outsourced to a digital circuit, connected to the analog circuit, so as to suitably program the electronic devices. This logic may thus rely on a sophisticated algorithm, a thing that would be more difficult to achieve based on a pure analog circuit. Still, the analog front-end is needed to select signals and couple such signals in the control lines, such that the "practical" programming is still performed by the analog circuit in that case.

In variants, however, the analog circuit 140-170 may comprise three functionally distinct circuits (though they are partly connected), i.e., an input circuit, a programming circuit, and a readout circuit, in order to select and couple appropriate input signals, program the electronic devices, and read out the output signals, respectively, without involving any digital processing at all. At least two of the three functions above are preferably performed analogically, while the third function (programming) may be partly offloaded to a digital processing unit. In other variants, however, all readouts can be converted to the digital domain and further processed digitally. In particular, the comparisons to the thresholds may be done using digital logic, as noted earlier.

Figure 2:
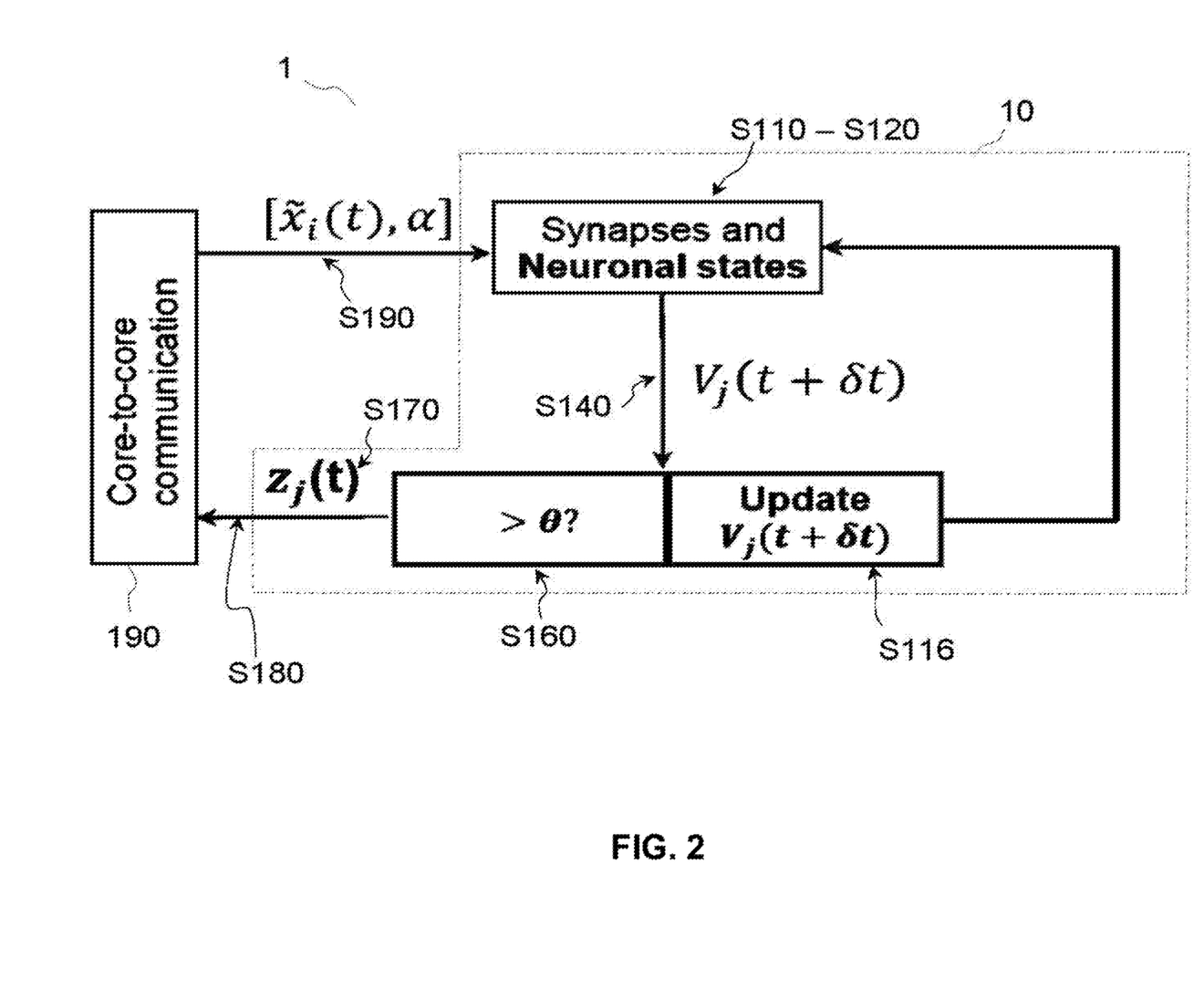
FIG. 2 is a diagram schematically illustrating high-level components of a neuromorphic system according to embodiments. The system comprises a neuromorphic devoice with a memristive crossbar array implementing a spiking neural network. The neuron functionality is now implemented by an analog circuit, which reads out all useful signals and computes the neuron outputs before translating such outputs to the digital domain.

Referring to FIG. 2, another aspect of the invention is now described, which concerns a neuromorphic system 1. The system 1 comprises L neuromorphic devices 10, such as described earlier in reference to FIGS. 3A-3B and FIGS. 4-5, as well as a communication bus. Generally speaking, the system 1 is configured to forward S180 output signals as read out at a given neuromorphic device 10 to a next one of the L neuromorphic devices via the communication bus, hence the cycle shown in FIG. 2. The communication bus will typically comprise analog-to-digital (ADC) converters and digital-to-analog (DAC) converters, in order to transmit digitalized versions of the signals from one neuromorphic device to the other. This way, several layers of neural networks can be formed, with the benefits of single, analog layers as described earlier.

As explained before too, the device 10 allows the programming S110-S120 the electronic devices, the multiply-accumulate operations S140, the updates S116, the comparison S160, and the spike computation S180 to be performed all in the analog domain, subject to the earlier comments as to the programming, which can be partly offloaded to a digital processing unit. Output signals are forwarded S180 to the core-to-core communication bus, which, as said, may optionally include some digital processing logic for updating weights and states. New input signals are accordingly obtained and received S190 at neurons of (another) device 10, embodying another layer, and so on.

Figure 6:
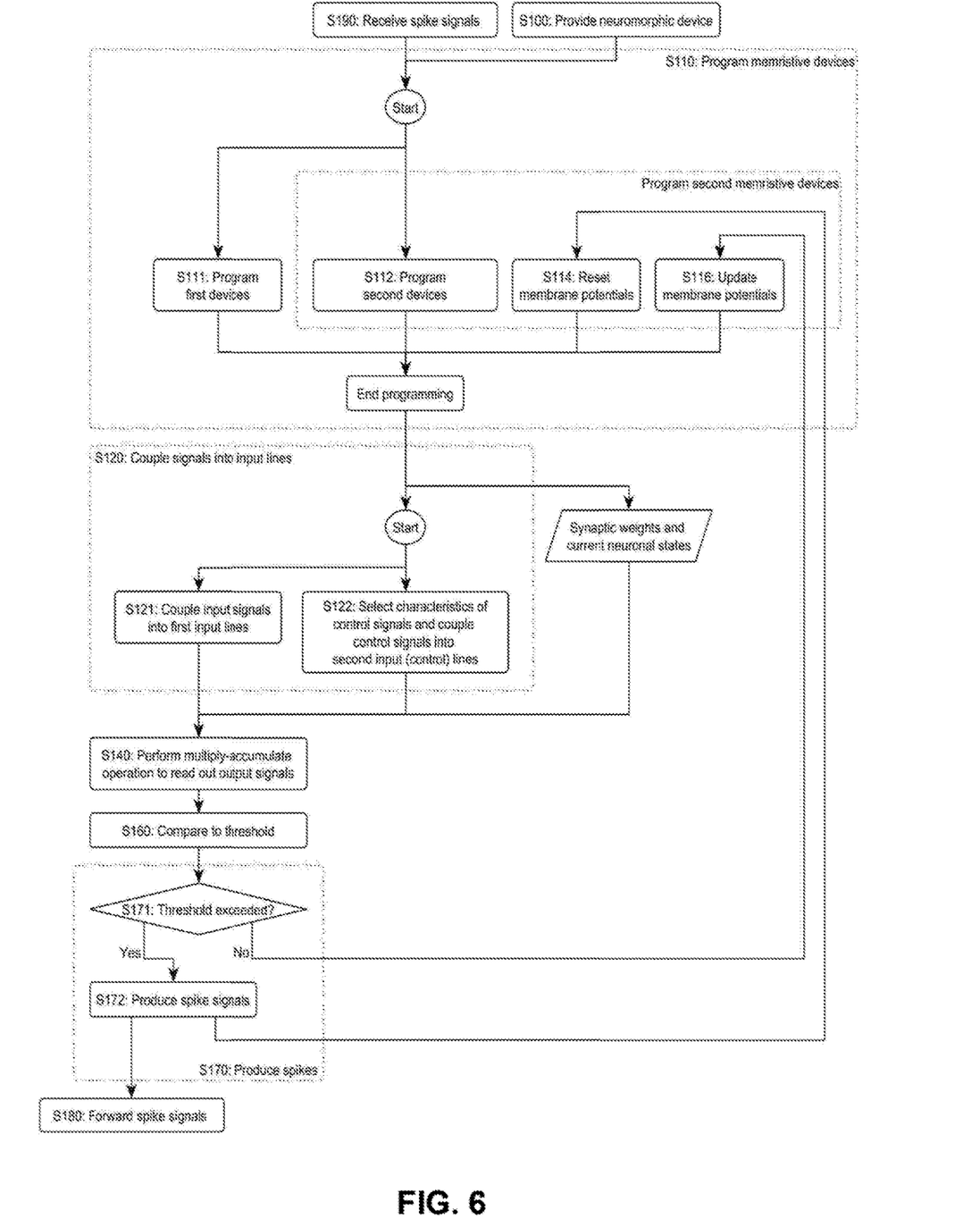
FIG. 6 is a flowchart illustrating high-level steps of a method of operating a neuromorphic device such as depicted in FIGS. 2 to 5, according to embodiments.

Referring next to the flowchart of FIG. 6, a final aspect of the invention concerns a method of operating a neuromorphic device 10-12 (or a system 1) such as described above. Essential aspects of this method have already been described in reference to the present devices and systems. This method is thus only succinctly described in the following.

Essentially, the method relies S100 on a neuromorphic device 10-12 such as described herein, I.e., with an analog circuit 140-170 and a crossbar array structure 110. The analog circuit 140-170 is notably used to program S110 the electronic devices so as for the first devices 131 to store synaptic weights and the second devices 132 to store neuronal states of an ANN layer implemented by the device. In addition, the analog circuit 140-170 reads out S140 the M output signals obtained from the M output lines 120. This is done according to a multiply-accumulate operation based on $N_1$ input signals coupled into the first input lines 111, $N_2$ control signals coupled into the second input lines 112, and values stored on each of the first devices 131 and the second devices 132, as explained earlier. This may notably lead to update (e.g., iteratively) S116 neuronal states stored on at least a subset of the $N_2 \times M$ second devices 132 by reprogramming said subset of the $N_2 \times M$ second devices 132 according to M output signals as previously read out (e.g., during a previous iteration) with the analog circuit 140-170.

For example, the flowchart of FIG. 6 shows the following operations, performed at the level of a neuromorphic device 10 embodying a single layer of an ANN, which can be regarded as an analog core computing device. First, memristive devices 131, 132 of the neuromorphic device are programmed S111, S112 via an input circuit or a programming circuit component of the analog circuit. The memristive devices include devices used to store neuronal states. Signals, including control signals, are then coupled S120 into input lines of the neuromorphic device. This includes coupling S121 input signals (determined based on, e.g., spike signals from a lower layer, as received at step S190) into input lines, and selecting and coupling S122 control signals into control lines. A multiply-accumulate operation is then performed at step S140, to obtain membrane potential values, which may be analogically compared S160 to a threshold value. Next, if the threshold is exceeded, S171, spike signals are produced at step S172, which are then forwarded S180 to the core-to-core communication infrastructure, which may relay such signals (and possibly further process them) to a next core 10, and so on.

The proposed approach notably allows spiking neural networks to be realized with multiple neurons and layers utilizing a memristive crossbar structure. The method provides a speed up over conventional computing paradigms and also enables advanced neural models. In particularly advantageous embodiments, the synaptic weights and neuronal states are represented by phase change memory devices 132, 132a-c, hence allowing a potential speedup compared to conventional devices. A mixed-precision training scheme as used for ANNs can for instance be adopted, which is compatible with analog cores as described herein.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A neuromorphic device comprising:
a crossbar array structure including N input lines and M output lines interconnected at junctions via N×M electronic devices, wherein the input lines comprise $N_1$ first input lines and $N_2$ second input lines that are connected to the M output lines via $N_1 \times M$ first devices of said electronic devices and $N_2 \times M$ second devices of said electronic devices, respectively, where $N_1 \geq 1$, $N_2 \geq 1$, $N_1+N_2=N$, and $M \geq 1$, wherein the $N_1 \times M$ first devices are operable for storing synaptic weight values, and the $N_2 \times M$ second devices are operable for storing neuronal state values, and wherein the $N_2$ second input lines comprise a given control line connected to the output lines via M given electronic devices, wherein the M given electronic devices are programmable by the analog circuit to store M initial membrane potential values; and
an analog circuit configured to:
store the synaptic weight values on the first devices and to store the neuronal state values on the second devices;
implement a neuronal state in a same memristive crossbar array structure as a synapse;
read out M output signals obtained from the M output lines, respectively, according to a multiply-accumulate operation based on $N_1$ input signals coupled into the first input lines, $N_2$ control signals coupled into the second input lines, and values stored on each of the first devices and the second devices, in operation;
the M output signals read out representative of M final membrane potential values, the M final membrane potential values obtained based on said M initial membrane potential values, as leaky integrators of synaptic inputs obtained by coupling said $N_1$ input signals into the $N_1$ first input lines in operation; and
update membrane potential values stored on the M given electronic devices by re-programming such devices according to M output signals representative of M final membrane potential values as previously read out by the analog circuit, in operation.

2. The neuromorphic device according to claim 1, wherein
the analog circuit is further configured to update neuronal states stored on at least some of the $N_2 \times M$ second devices by re-programming said at least some of the $N_2 \times M$ second devices according to M output signals as previously read out by the analog circuit in operation.

3. The neuromorphic device according to claim 1, wherein:
the analog circuit is further configured to couple said $N_1$ input signals and said $N_2$ control signals into the $N_1$ first input lines and the $N_2$ second input lines, respectively.

4. The neuromorphic device according to claim 1, wherein
the analog circuit is further configured to perform, for each of the M output lines, a comparison between each of the M output signals read out and a threshold value $\theta$.

5. The neuromorphic device according to claim 4, wherein
the analog circuit is further configured to produce, for each of the M output lines, a signal based on an outcome of said comparison, and to reset values stored on any of said M given electronic devices.

6. The neuromorphic device according to claim 4, wherein:
the second electronic devices comprise M further electronic devices and the second input lines comprise a further control line connected to the output lines via the M further electronic devices, wherein the M further electronic devices are programmable by the analog circuit to store M threshold values, so as for the M output signals read out to be representative of M differences of the M final membrane potential values and the M threshold values for a suitably selected, further control signal coupled into said further control line in operation.

7. The neuromorphic device according to claim 6, wherein
the analog circuit is configured to select the further control signal to be coupled into said further control line, for the further control signal to be representative of either:
an input value of 0, whereby the M output signals read out are representative of the M final membrane potential values; or
an input value of −1; whereby the M output signals read out are representative of differences of the M final membrane potential values and the M threshold values.

8. The neuromorphic device according to claim 1, wherein
the given control signal coupled into said given control line is representative of a decay parameter $\alpha$, in operation, and
the analog circuit is further configured to adjust the $N_1$ input signals for them to be representative of synaptic input values that are complementarily scaled by $1-\alpha$.

9. The neuromorphic device according to claim 1, wherein:
the second input lines comprise three control lines, including said given control line, whereby the three control lines include two additional control lines beyond said given control line,
said two additional control lines are connected to the output lines via 2×M additional electronic devices of said electronic devices, and
the analog circuit is further configured to program the 2×M additional electronic devices for them to store operands of adaptive firing thresholds.

10. The neuromorphic device according to claim 9, wherein:
the analog circuit is further configured to couple two additional control signals into said two additional control lines and to select each of the two additional control signals so as for the output signals read out by the circuit to be representative of M differences of M final membrane potential values and M adaptive firing thresholds.

11. The neuromorphic device according to claim 10, wherein
the analog circuit is further configured to re-program M electronic devices of said 2×M additional electronic devices that connect one of said two additional control lines, so as to update operands stored thereon according to output values as previously read out by the analog circuit, in operation.

12. The neuromorphic device according to claim 1, wherein
the analog circuit is further configured to re-program the $N_1 \times M$ first devices, so as to alter synaptic weights stored thereon according to an automatic learning process.

13. The neuromorphic device according to claim 1, wherein
said analog circuit comprises a programming circuit and a readout circuit, the readout circuit connected to the programming circuit, wherein the readout circuit is configured to read out said M output signals and the programming circuit is configured to program the electronic devices according to output signals previously read out by the readout circuit.

14. The neuromorphic device according to claim 13, wherein
said programming circuit comprises an input circuit, the input circuit configured to, on the one hand, couple signals into the input lines and, on the other hand, select signals to be coupled into the input lines, so as to program the electronic devices based on signals coupled into the input lines, in operation.

15. The neuromorphic device according to claim 1, wherein
each of said electronic devices includes a memristive device.

16. A neuromorphic system, comprising
L neuromorphic devices, each according to claim 1, and
a communication bus, wherein the system is configured to forward output signals as read out at a given one of the L neuromorphic devices to a next one of the L neuromorphic devices via the communication bus.

17. A method of operating a neuromorphic device, the method comprising:
providing a neuromorphic device with an analog circuit and a crossbar array structure, the crossbar array structure including N input lines and M output lines interconnected at junctions via $N \times M$ electronic devices, wherein the input lines comprise $N_1$ first input lines and $N_2$ second input lines that are connected to the M output lines via $N_1 \times M$ first devices of said electronic devices and $N_2 \times M$ second devices of said electronic devices, respectively, where $N_1 \geq 1$, $N_2 \geq 1$, $N_1 + N_2 = N$, and $M \geq 1$, wherein the $N_1 \times M$ first devices are operable for storing synaptic weight values, and the $N_2 \times M$ second devices are operable for storing neuronal state values, and wherein the $N_2$ second input lines comprise a given control line connected to the output lines via M given electronic devices, wherein the M given electronic devices are programmable by the analog circuit to store M initial membrane potential values; and
an analog circuit configured to:
store the synaptic weight values on the first devices and to store the neuronal state values on the second devices;
implement a neuronal state in a same memristive crossbar array structure as a synapse;
read out M output signals obtained from the M output lines, respectively, according to a multiply-accumulate operation based on $N_1$ input signals coupled into the first input lines, $N_2$ control signals coupled into the second input lines, and values stored on each of the first devices and the second devices, in operation;
the M output signals read out representative of M final membrane potential values, the M final membrane potential values obtained based on said M initial membrane potential values, as leaky integrators of synaptic inputs obtained by coupling said $N_1$ input signals into the $N_1$ first input lines in operation; and
update membrane potential values stored on the M given electronic devices by re-programming such devices according to M output signals representative of M final membrane potential values as previously read out by the analog circuit, in operation.

18. The method according to claim 17, wherein the method further comprises:
updating neuronal states stored on at least some of the $N_2 \times M$ second devices by re-programming said at least some of the $N_2 \times M$ second devices according to M output signals as previously read out with the analog circuit.

* * * * *